(12) United States Patent
Lang et al.

(10) Patent No.: US 10,146,248 B2
(45) Date of Patent: Dec. 4, 2018

(54) MODEL CALCULATION UNIT, CONTROL UNIT AND METHOD FOR CALIBRATING A DATA-BASED FUNCTION MODEL

(71) Applicant: Robert Bosch GmbH, Stuttgart (DE)

(72) Inventors: Tobias Lang, Kirchberg (DE); Heiner Markert, Stuttgart (DE); Axel Aue, Korntal-Muenchingen (DE); Wolfgang Fischer, Gerlingen (DE); Ulrich Schulmeister, Bietigheim-Bissingen (DE); Nico Bannow, Stuttgart (DE); Felix Streichert, Edakita (JP); Andre Guntoro, Pforzheim (DE); Christian Fleck, Gerlingen (DE); Anne Von Vietinghoff, Karlsruhe (DE); Michael Saetzler, Stuttgart (DE); Michael Hanselmann, Korntal (DE); Matthias Schreiber, Stuttgart-Feuerbach (DE)

(73) Assignee: ROBERT BOSCH GMBH, Stuttgart (DE)

( * ) Notice: Subject to any disclaimer, the term of this patent is extended or adjusted under 35 U.S.C. 154(b) by 820 days.

(21) Appl. No.: 14/247,136

(22) Filed: Apr. 7, 2014

(65) Prior Publication Data
US 2014/0310325 A1 Oct. 16, 2014

(30) Foreign Application Priority Data

Apr. 10, 2013 (DE) .................. 10 2013 206 302
Jul. 9, 2013 (DE) .................. 10 2013 213 420

(51) Int. Cl.
G06F 7/544 (2006.01)
G06F 1/02 (2006.01)
G06F 7/556 (2006.01)

(52) U.S. Cl.
CPC .............. *G06F 1/02* (2013.01); *G06F 7/5443* (2013.01); *G06F 7/556* (2013.01)

(58) Field of Classification Search
None
See application file for complete search history.

(56) References Cited

U.S. PATENT DOCUMENTS 6,223,196 B1* 4/2001 Hattori .................. G06F 7/5443
708/523
2010/0198894 A1* 8/2010 Azadet .................... G06F 1/035
708/209

(Continued)

FOREIGN PATENT DOCUMENTS

CN 101369999 A 2/2009
CN 102175916 A 9/2011

(Continued)

OTHER PUBLICATIONS

C. Plagemann, K. Kersting, W. Burgard, "Nonstationary Gaussian Process Regression Using Point Estimates of Local Smoothness," ICML Proceedings, pp. 204-2116, 2006.

*Primary Examiner* — David H Malzahn
(74) *Attorney, Agent, or Firm* — Norton Rose Fulbright US LLP; Gerard Messina

(57) ABSTRACT

A model calculation unit for calculating a data-based function model in a control unit is provided, the model calculation unit having a processor core which includes: a multiplication unit for carrying out a multiplication on the hardware side; an addition unit for carrying out an addition on the hardware side; an exponential function unit for calculating an exponential function on the hardware side; a memory in the form of a configuration register for storing hyperparameters and node data of the data-based function model to be calculated; and a logic circuit for controlling, on the hardware side, the calculation sequence in the multipli- (Continued)

cation unit, the addition unit, the exponential function unit and the memory in order to ascertain the data-based function model.

6 Claims, 3 Drawing Sheets

(56) References Cited

U.S. PATENT DOCUMENTS

| | | | | |
|---|---|---|---|---|
| 2013/0110749 A1* | 5/2013 | Streichert | ........... | F02D 41/1401 706/12 |
| 2014/0067889 A1* | 3/2014 | Mortensen | ................ | G06F 7/57 708/201 |
| 2014/0309973 A1* | 10/2014 | Fischer | ................... | G06F 17/50 703/2 |
| 2014/0310325 A1* | 10/2014 | Lang | ......................... | G06F 1/02 708/270 |
| 2014/0351309 A1* | 11/2014 | Fischer | ................ | G06F 7/5443 708/501 |
| 2015/0012574 A1* | 1/2015 | Fischer | ................... | H03M 7/02 708/105 |
| 2015/0012575 A1* | 1/2015 | Markert | ................ | G05B 13/04 708/105 |

FOREIGN PATENT DOCUMENTS

| | | |
|---|---|---|
| DE | 102008001081 A1 | 10/2009 |
| DE | 10 2010 028 259 | 10/2011 |
| DE | 10 2010 028 266 | 10/2011 |
| JP | 2001236496 A | 8/2001 |
| JP | 2005157876 A | 6/2005 |

\* cited by examiner

MODEL CALCULATION UNIT, CONTROL UNIT AND METHOD FOR CALIBRATING A DATA-BASED FUNCTION MODEL

BACKGROUND OF THE INVENTION

1. Field of the Invention

The present invention relates to a model calculation unit for a control unit in which data-based function models for carrying out functions on the hardware side are implemented. The present invention also relates to a method for calculating data-based function models in such a model calculation unit.

2. Description of the Related Art

Control units having a main processor unit and a separate model calculation unit for calculating data-based function models are known from the related art. The publication DE 10 2010 028 266 A1, for example, shows a control unit having an additional logic circuit as a model calculation unit, which is designed on the hardware side for calculating exponential functions. This makes it possible to support Bayesian regression methods in a hardware unit, which are required in particular for calculating Gaussian process models.

The model calculation unit is on the whole designed to carry out mathematical processes for calculating the data-based function model based on parameters and node or training data. In particular, the model calculation unit is designed on the hardware side for efficient calculation of exponential functions, thereby making it possible to calculate Gaussian process models at a higher computation rate than is possible in the main processing unit. Generally, configuration data which include parameters and nodes for calculating the data-based function model are read into the model calculation unit prior to calculation in the latter, and subsequently the calculations based on the configuration data are carried out by the hardware of the model calculation unit. The previous implementation of the hardware of such a model calculation unit may, however, lead to numerical problems during the calculation in the case of unfavorable configuration data, so that not all data-based function models determined off-line may be stably calculated on the model calculation unit.

BRIEF SUMMARY OF THE INVENTION

According to one first aspect of the present invention, a model calculation unit is provided as a hardware unit for calculating a data-based function model in a control unit, the model calculation unit having a processor core, the processor core including:
- a multiplication unit for carrying out a multiplication on the hardware side;
- an addition unit for carrying out an addition on the hardware side;
- an exponential function unit for calculating an exponential function on the hardware side;
- a configuration register or memory for storing hyperparameters and node data of the data-based function model to be calculated; and
- a logic circuit for controlling, on the hardware side, the calculation sequence in the multiplication unit, the addition unit, the exponential function unit and the configuration register or memory in order to ascertain the data-based function model.

The model calculation unit is a logic unit which includes hardware designed for carrying out certain calculations on the hardware side for data-based function models, in particular for shared integration with a processor core. With the aid of this logic unit a calculation method for a Bayesian regression model previously trained and stored on the hardware is carried out on-line. The use of a Gaussian process model as a data-based function model makes it possible to ascertain the model value of the Gaussian process model as a sequence of additions and multiplications as well as of an exponential function, in particular through transformation of the input standardization of a test point at which a model value is to be ascertained, and through transformation of the exponential term.

In particular, the model calculation unit may be composed exclusively of the above-mentioned components.

It is possible in hardware to implement a hardware function block, a so-called MAC-block (MAC=multiplier accumulator) for integer calculations or FMA-block (FMA: fused multiply-add, also referred to as FMAC-block (FMAC: fused multiply accumulate) for floating-point calculations. In this description, this hardware function block is referred to as an MAC unit for integer as well as floating point calculations. The MAC unit may execute particularly efficiently and therefore quickly the operation a+b×c through direct implementation in hardware. In some cases this is possible within a few clock cycles and, in specific cases, even within one clock cycle.

By separately providing such a model calculation unit having an MAC unit implemented in hardware and an exponential function unit implemented in hardware for exclusively calculating an exponential function, it is possible to provide a particularly efficient logic circuit, which may be used as a model calculation unit integrated with a processor core (used for executing software) in a control unit for ascertaining the model values for data-based function models, in particular Gaussian process models.

Furthermore, the multiplication unit and the addition unit may be implemented separately or in combination in an MAC unit.

According to one specific embodiment, multiple processor cores may be provided, several of the multiple processor cores including a shared exponential function unit and/or a shared MAC unit. Alternatively, it may also be provided that each processor core includes a separate exponential function unit and a separate MAC unit.

It may be provided that the function model assigns a model value to multiple input variables, the calculation sequence being designed to carry out in each case a multiplication and an addition with the aid of the MAC unit for a calculation of an input standardization of the input variables, as well as a multiplication and addition with the aid of the MAC unit for a calculation of an output standardization of the output variable.

According to one specific embodiment, the function model may provide the calculation of a term $((x)_i - u)^2$, in which $x_i$ corresponds to the nodes of the data-based function model and u corresponds to the input variables, the logic circuit activating the addition unit and the multiplication unit and the MAC circuit in order to carry out the calculation of the term by an addition unit and a multiplication unit or by an MAC unit.

According to another aspect, a control unit, in particular for an engine system having an internal combustion engine, is provided which includes a processor unit and the above-mentioned model calculation unit.

According to one further aspect, a method is provided for calculating a data-based function model, in particular a Gaussian process model, in the above-mentioned model calculation unit, the function model being fully calculated by calculation steps carried out successively, the calculation steps including only a combined multiplication and addition as well as a calculation of an exponential function.

DETAILED DESCRIPTION OF THE INVENTION

Figure 1:
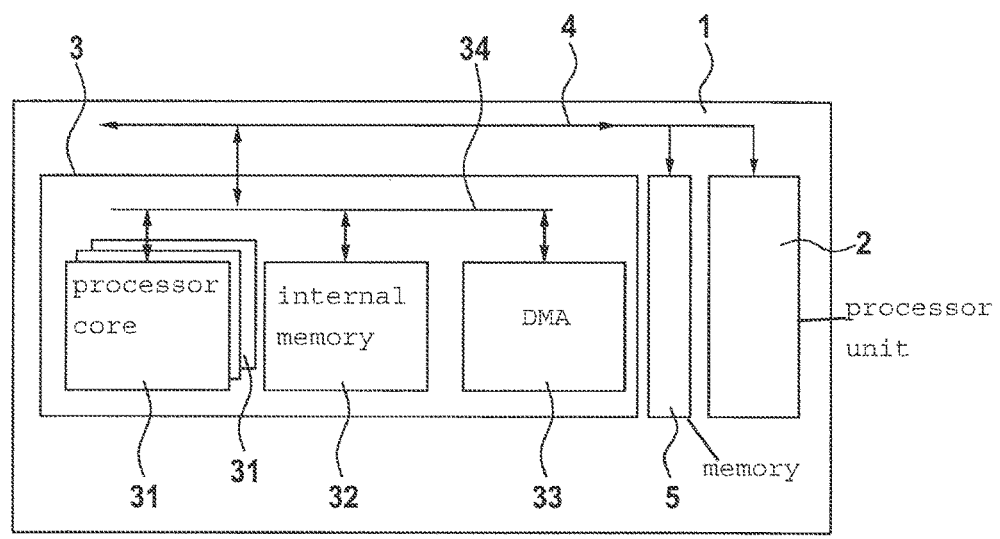
FIG. 1 schematically shows a representation of hardware architecture for a control unit for controlling a physical system.

FIG. 1 schematically shows a representation of a hardware architecture for an integrated control unit 1, in which a processor unit 2 and a model calculation unit 3 are provided in an integrated manner for calculation on the hardware side of a data-based function model. Processor unit 2 and model calculation unit 3 communicate with one another via a system bus 4.

Model calculation unit 3 in principle includes merely hardware (hard-wired) and is preferably not designed to execute software. For this reason it is also unnecessary to provide a processor in model calculation unit 3. This enables a resource-optimized implementation of such a model calculation unit 3.

Model calculation unit 3 may include one or multiple processor cores 31, an internal memory 32 and a DMA unit 33 (DMA=direct memory access). Processor cores 31, internal memory 32 and DMA unit 33 are connected to one another via an internal communications link 34.

The use of nonparametric, data-based function models is based on a Bayesian regression method. The basics of the Bayesian regression are described, for example, in C. E. Rasmusen et al., "Gaussian Processes for Machine Learning," MIT Press 2006. The Bayesian regression is a data-based method which is based on a model. For creating the model, measuring points of training data and associated output data of an output variable are required. The model is created by using node data which correspond fully or in part to the training data or are generated from these. In addition, abstract hyperparameters are determined which parameterize the space of the model functions and effectively weight the influence of the individual measuring points of the training data on the later model prediction.

The abstract hyperparameters are determined by an optimization method. One option for such an optimization method is an optimization of a marginal likelihood $p(Y|H, X)$. The marginal likelihood $p(Y|H,X)$ describes the plausibility of the measured y-values of the training data, represented as vector Y, given the model parameter H and the x-values of the training data. In the model training, $p(Y|H, X)$ is maximized by searching for suitable hyperparameters with which the data may be particularly clearly explained. To simplify the calculation, the logarithm of $p(Y|H,X)$ is maximized since the logarithm does not alter the consistency of the plausibility function.

In this connection, the optimization method automatically ensures a trade-off between model complexity and reproduction accuracy of the model. Increasing model complexity may in fact lead to an arbitrarily high reproduction accuracy of the training data, but at the same time this may lead to an over-fitting of the model to the training data and therefore to a poorer generalization property.

Figure 2:
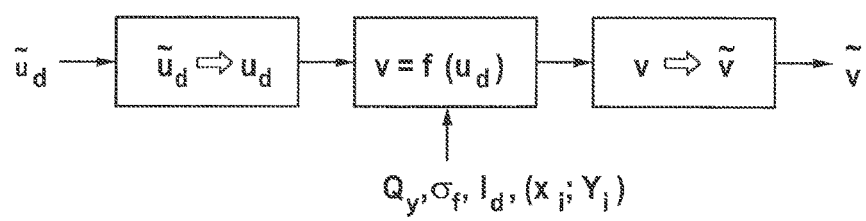
FIG. 2 shows a block diagram for ascertaining the model value for a Gaussian process model for a D-dimensional input value of an input variable vector.

The Gaussian process model is calculated according to the steps schematically shown in FIG. 2. The input values $\tilde{u}_d$ for a test point u (input variable vector) are initially standardized, specifically according to the formula:

$$u_d = \frac{\tilde{u}_d - (m_x)_d}{(s_x)_d}$$

Here, $m_x$ corresponds to the mean value function with respect to a mean value of the input values of the node data and $s_y$ corresponds to the variance of the input values of the node data.

As the result of the creation of the nonparametric function model one obtains:

$$v = \sum_{i=1}^{N} (Q_y)_i \sigma_f \exp\left(-\frac{1}{2} \frac{((x_i)_d - u_d)^2}{l_d}\right)$$

The model value v thus obtained is standardized with the aid of an output standardization, according to the formula:

$$\tilde{v} = v s_y + m_y$$

Here, v corresponds to a standardized model value (output value) at a standardized test point u (input variable vector of the dimension D), $\tilde{v}$ corresponds to a (non-standardized) model value (output value) at a (non-standardized) test point $\tilde{u}$ (input variable vector of the dimension D), $x_i$ corresponds to one node of the node data, N corresponds to the number of nodes of the node data, D corresponds to the dimension of the input data-/training data-/node data space, and $l_d$ and $\Sigma_f$ correspond to the hyperparameters from the model training. Vector $Q_y$ is a variable calculated from the hyperparameters and the training data. In addition, $m_y$ corresponds to the mean value function with respect to a mean value of the output values of the node data and $s_y$ corresponds to the variance of the output values of the node data.

The input and output standardization occurs since the calculation of the Gaussian process model typically takes place in a standardized space.

At the start of a calculation, processor unit 2 instructs DMA unit 33 to load the configuration data relevant to the function model to be calculated from memory 5 into internal memory 32 and to start the calculation in the processor core 31, which is carried out with the aid of the configuration data. The configuration data include the hyperparameters of a Gaussian process model as well as node data.

The processing chain resulting from FIG. 2 is unfavorable for a numerical calculation and may in the present case potentially not be able to be stably calculated in the model calculation unit 3. Therefore, it is provided to design the processor core 31 in such a way that the calculations may be carried out quickly and/or numerically stably in a simple manner. For this purpose, the input standardization is replaced by $$u_d = (s'_x)_d \cdot \tilde{u}_d + (m'_x)_d$$

with $$(s'_x)_d = \frac{1}{(s'_x)_d}$$

and $$(m'_x)_d = \frac{(m_x)_d}{(s_x)_d}$$

In addition, the prediction of the Bayesian regression model may be replaced by:

$$v = \sum_{i=1}^{N} (Q'_y)_i \cdot \exp\left(-\sum_{d=1}^{D} l'_d \cdot ((x_i)_d - u_d)^2\right)$$

with $$(Q'_y)_i = (Q_y)_i \sigma_f$$

and $$l'_d = \frac{1}{2l_d}$$

The inner sum loop totals the products of $l'_d$ with the square difference between the node data and the test point u online. The length scales $l_d$ are typically different for each model. The transformation of the input standardization and the reformulation of the Bayesian regression model mean that the processor core 31 may repeatedly use operations of the form a+b×c for calculating the model value.

In a hardware implementation, a calculation of the form a+b×c is possible in a particularly efficient manner with the aid of a so-called MAC unit. Such an MAC unit may be implemented in hardware in order to be able to carry out a corresponding calculation within a few clock cycles. In some cases the calculation may even take place within one clock cycle. The above specified transformation and reformation also result in a numerically stable calculation of the model value in processor core 31. The calculation is carried out in hardware as indicated in the attached pseudo-C-code.

```
/* step 1: input standardization */
001: for (k=0; k<D; k++) {
002: ŭ [k] = u[k]*(s'_x)[k]+(m'_x)[k];       MAC
003: )
/* step 2: calculation of outer loop */
004: for (j=0; j<N; j++) {
005: i = j * D;
/* step 2a: calculation of inner loop */
006: t = 0.0;
007: for (k=0; k<D; k++) {
008: d = ŭ [k] − v[i+k];                     MAC (Add)
009: d = d*d;                                MAC (Mul)
010: t += 1' [k]*d;                          MAC
011: }
/* step 2b: calculation of exponential function */
012: e = exp(−t) ;
/* step 2c: */
013: y += (Q'_y)[j] * e;                     MAC
014: }
/* step 3: output standardization */
015: z = m_y;
016: z += y*s_y;                             MAC
017: return z;
```

It should be noted that the length scale $l'_d$ is always positive, since the exponential function may only be numerically exact in the negative input range and therefore optimized accordingly, i.e.

$$\exp\left(-\left|\sum_{d=1}^{D} l'_d \cdot ((x_i)_d - u_d)^2\right|\right)$$

In addition, the weighting factor ½ in the length scale $l'_d=\frac{1}{2} l_d$ may also be implemented in hardware in a space efficient manner so that the stored length scale may only be stored in reciprocal form.

Figure 3:
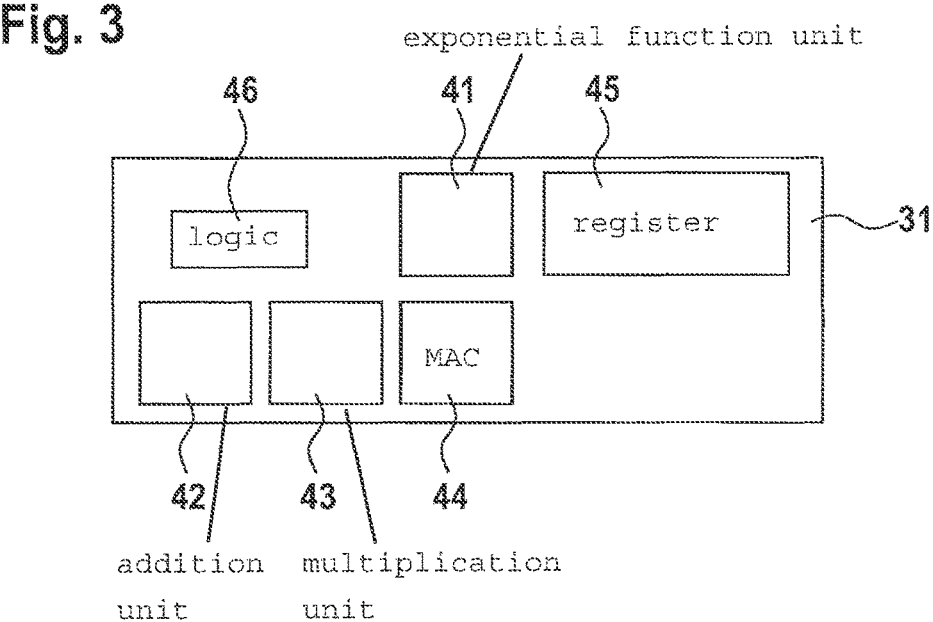
FIG. 3 shows a detailed representation of a processor core in a model calculation unit of the control unit.

With the above-mentioned reformulation it is possible to carry out the computing process shown in FIG. 2 with the following units in processor core 31, shown in detail in FIG. 3. Processor core 31 includes in addition an exponential function unit 41, a multiplication unit 43, an addition unit 42 or its known conjoined form of an MAC unit 44. To ensure the flexibility of the hardware, the required parameters, namely the test point u, the node data $x_i$, the number of dimensions D, the number of training data N, are configurable. These are compiled and stored in a configuration register or memory and may be represented, for example, as register 45 and pointer registers, which may be written on by processor unit 2.

The above-mentioned calculation sequence specified in the pseudo-C-code is controlled by a logic circuit 46. Logic circuit 46 represents a corresponding wiring and sequence control.

The reformulation also makes it possible to implement the full calculation of the Gaussian process model in hardware. The calculation may be carried out essentially with the aid of MAC unit 44 and exponential function unit 41. The use of the blocks is specified in the above-mentioned pseudo-C-code on the right-hand side.

However, the calculation $((x_i)_d-u_d)^2$ may also be carried out in a dedicated addition unit and multiplication unit, so that the calculation runs quickly.

Figure 4:
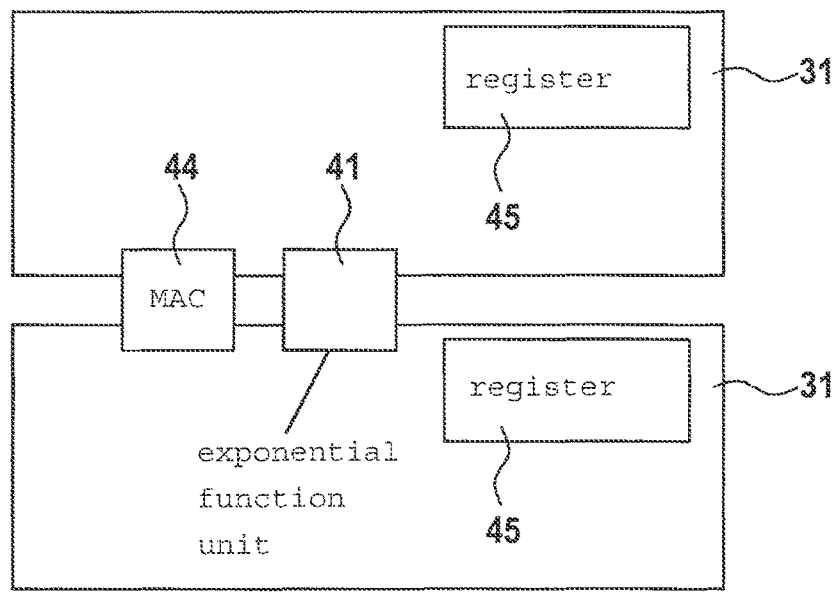
FIG. 4 schematically shows a representation of a hardware architecture for two processor cores, which together use an MAC unit and an exponential function unit.

As shown in FIG. 1, multiple processor cores 31 may be provided in model calculation unit 3 in order to calculate multiple Gaussian process models or partial models independently of one another and in parallel. As shown in FIG. 4, each processor core 31 has its own configuration register, and its own memory into which the input values of the test point u, the node data $x_i$ and all other parameters are loaded. The implementation of multiple processor cores 31 may, for example, be achieved through pipeline technology.

There is also the optimization option that one or multiple parts of model calculation unit 3 are implemented only once and are utilized by multiple processor cores 31 in order to save on hardware resources. Thus, for example, processor cores 31 may access a shared MAC unit 44 or a shared exponential function unit 41.

The implementation of multiple processor cores 31 may, for example, be optimized by a (time) multiplex technique. In the time multiplex technique there is a constant clock assignment to the units, for example, to two processor cores 31, i.e., even clocks and odd clocks are assigned to one corresponding processor core of, for example, two processor cores.

In general, the assignment of processor cores 31 in the multiplex technique takes place as needed (e.g., with the aid of logic circuit 46). The multiplex technique may also provide a redundancy, in which the calculations of one processor core, if it should fail, are carried out by another processor core.

Figure 5:
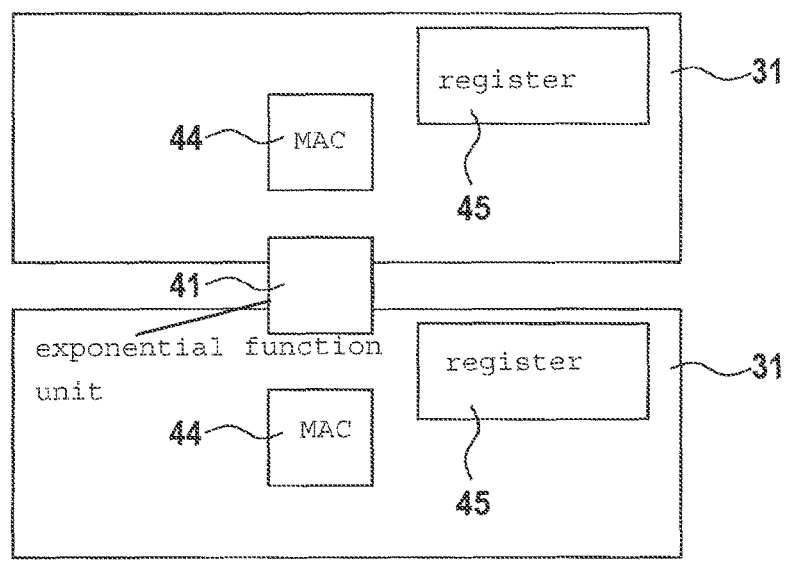
FIG. 5 schematically shows a representation of another hardware architecture for two processor cores having separate MAC units and a shared exponential function unit.

The implementation of FIG. 5, in contrast, shows two processor cores 31, each including its own MAC unit 44, which access a shared exponential function unit 41.

What is claimed is:

1. A model calculation unit for calculating a data-based function model in a control unit, comprising:
    at least one processor core which includes:
        a multiplication unit for carrying out a multiplication in hardware;
        an addition unit for carrying out an addition in hardware;
        an exponential function unit for calculating, in hardware, exclusively only an exponential function;
        a memory in the form of a configuration register for storing hyperparameters and node data of the data-based function model to be calculated; and
        a logic circuit for controlling, in hardware, a calculation sequence in the multiplication unit, the addition unit, the exponential function unit and the memory in order to calculate the data-based function model;
    wherein the function model assigns a model value to multiple input variables, and wherein the logic circuit is configured to control, in hardware, the calculation sequence to (i) carry out a multiplication and an addition for a calculation of an input standardization of the input variables, and (ii) carry out a multiplication and an addition for a calculation of an output standardization of the output variable.

2. The model calculation unit as recited in claim 1, wherein the multiplication unit and the addition unit are provided in a MAC unit combined in hardware.

3. The model calculation unit as recited in claim 2, wherein multiple processor cores are provided, at least two of the multiple processor cores having at least one of a shared exponential function unit and a shared MAC unit.

4. The model calculation unit as recited in claim 2, wherein the function model provides a calculation of a term $((x)_i - u)^2$, $x_i$ corresponding to the nodes of the data-based function model and u corresponding to the input variables, and wherein the logic circuit is configured to carry out the calculation of the term $((x)_i - u)^2$ with the aid of one of (i) the MAC unit or (ii) the multiplication unit and the addition unit.

5. A model calculation unit for calculating a data-based function model in a control unit, comprising:
    at least one processor core which includes:
        a multiplication unit for carrying out a multiplication in hardware;
        an addition unit for carrying out an addition in hardware;
        an exponential function unit for calculating, in hardware, exclusively only an exponential function;
        a memory in the form of a configuration register storing hyperparameters and node data of the data-based function model to be calculated; and
        a logic circuit for controlling, in hardware, a calculation sequence in the multiplication unit, the addition unit, the exponential function unit and the memory in order to calculate the data-based function model.

6. The model calculation unit as recited in claim 5, wherein multiple processor cores are provided, at least two of the multiple processor cores having a shared exponential function unit.

* * * * *